United States Patent [19]

Akhtar

[11] Patent Number: 5,320,716
[45] Date of Patent: * Jun. 14, 1994

[54] ELECTROACTIVE, INSULATIVE AND PROTECTIVE THIN FILMS

[76] Inventor: Masud Akhtar, 8 Wexford Dr., Lawrenceville, N.J. 08648

[*] Notice: The portion of the term of this patent subsequent to Mar. 17, 2009 has been disclaimed.

[21] Appl. No.: 852,022

[22] Filed: Mar. 16, 1992

Related U.S. Application Data

[63] Continuation-in-part of Ser. No. 546,897, Jul. 2, 1990, Pat. No. 5,096,561.

[51] Int. Cl.$^5$ ............................................. C25B 13/08
[52] U.S. Cl. .................. 204/59 R; 204/296; 521/27; 429/192; 429/30; 429/33; 210/348; 210/500.27
[58] Field of Search ................ 204/296, 59 R; 428/308.4, 473.5; 521/27, 30; 429/192, 30, 33; 252/622; 210/348, 500.27

[56] References Cited

U.S. PATENT DOCUMENTS 5,096,561 3/1992 Akhtar ................ 204/296
5,158,880 10/1992 Eveleigh ................ 204/82

*Primary Examiner*—Kathryn Gorges
*Attorney, Agent, or Firm*—George E. Kersey

[57] ABSTRACT

Thin polymeric films, coatings and ionic conductors by cross-linking a polymer matrix, such as a polyethyleneimine, polyetheramine, polyallylamine or polyacrlyamide, with a fluorocarbon containing epoxide or anhydride. The compositions are of high integrity and posses properties, such as insulation, ion conduction, anticorrosion, antifouling and self-adhesion. Specific compositions absorb and release acidic gases and liquids.

10 Claims, No Drawings

ELECTROACTIVE, INSULATIVE AND PROTECTIVE THIN FILMS

This invention is a continuation-in-part of application Ser. No. 07/546,897 filed Jul. 2, 1990, now U.S. Pat. No. 5,096,561 issued Mar. 17, 1992.

The invention relates to polymeric ionic conductive, polymeric coatings and protonated polymeric components. The invention relates more particularly to polymeric ionic conduction in electrolytes or separators for electrochemical processes and devices; coatings which are drag-reducing, antifouling, anticorrosive and water repellent; and protonated composites which can absorb and release electron-donating molecules.

In a wide variety of applications, it is desirable to improve polymeric ion conduction, the resistance of polymeric coatings, and the absorption and release of electron donating molecules.

In electrochemical applications, for example, it is desirable to employ solid-state electrolytes having preselected ionic conductivities at ambient temperatures. Solid electrolytes having this characteristic are generally prepared by complexing ionic salts with polymers such as poly(ethyleneoxide) and poly(ethyleneimine). These electrolytes have low ionic conductivities at room temperatures because of the formation of crystallites. In addition, the ambient temperature conductivities are low because phase separation and material deformation take place at temperatures in the range of 60°-80° C.

Another type of solid polymeric electrolyte is derived from proton conducting materials such as polystyrene sulfonic acid, polyperfluorosulfonic acid, and poly-2-acrylamido-2-methylpropane sulfonic acid. Protonic conductivity associated with these materials requires the presence of small amounts of water. This limits the reliability and utility of such conductivity, besides being corrosive in nature due to the presence of moisture.

In the case of corrosion-resistant polymers, the present methods of production are complex and expensive.

Similarly, for the absorption and release of electron donating molecules, for example the absorption of objectional sulfur dioxide from the burning of fossil fuels and other sulfur containing materials, one technique has been to use a mixture of an organic amine and an acid to form a water-soluble salt that complexes with sulfur dioxide, which is later, and controllably released by heating. Unfortunately, the heating costs are so great that the process is largely uneconomic.

Accordingly, it is an object of the invention to facilitate polymeric ionic conduction, and the production of polymeric coatings and protonated polymeric components. A related object of the invention is to achieve improved polymeric ionic conduction in electrolytes or separators for electrochemical processes and devices; improved coatings which are drag-reducing, antifouling, anticorrosive and water repellent; and protonated composites which can simplify the absorption and release of electron-donating molecules.

Another object of the invention to provide solid-state ion conducting electrolytes which can operate in a relatively wide temperature range extending from below 0° C. to as low as $-10°$, and above 100° to as high as 200° C. A related object is to realize such electolytes with conductivities which are not limited by material phase changes or absorbed molecules of water or solvent.

A further object of the invention is to provide amorphous polymeric ionic conductors with improved conductivity and stability for electrochemical processes over a wide temperature range.

Still another object of the invention is to provide polymeric selective ionic conductors in the form of flexible, non-brittle, and free standing thin films.

A still further object is to achieve the absorption and release of contaminants, such as sulfur dioxide, without the use of water soluble salts that absorb contaminants, but require excessive heating, and strictly controlled conditions for release of the absorbed contaminants.

Yet another object of the invention is to provide simple processes for the production of polymeric thin films which are moldable, and can be coated or laminated to general substrates in transparent or opaque, electroactive or insulative, and protective or decorative forms.

SUMMARY OF THE INVENTION

In accomplishing the foregoing and related objects, polymeric films which can serve as ionic conductors, coatings or protonated composites, are prepared from organic polymeric matrix materials, such as poly(reactive) compounds, and compounds having halocarbon backbones.

Suitable poly(reactive) compounds possess oxygen and/or nitrogen atoms. Poly(ethylene reactive), poly(ether reactive), poly(acryl reactive) and poly(allyl reactive) compounds are particularly suitable and include ethyleneimines, amines, oxides and sulfides; etherimines, amines, oxides and sulfides; acrylamides, imides, oxides and sulfides; allylamines, imines, oxides and sulfides.

The halocarbon compounds include mono and poly epoxides, mono and polyvinyls, and mono and poly anhydrides. They serve as cross-linking agents and impart special properties to the composite material. These properties include flexibility, improved chemical and environmental inertness, water resistance and insolubility, and transparency, as well as related halocarbon surface properties.

When the composites contain nitrogen or oxygen electron donor atoms, they make selective ion conducting adducts with salts, acids, or alkyl halides to form cationic, protonic, or anionic transport materials.

Illustrative cross-linking agents for linear or branched polymeric matrices include epoxides, vinyls and anhydrides. Poly(ethyleneimines) diepoxides and dianhydrides having fluorocarbon backbones are particularly suitable. For polyetheramines, the cross-linking agents are diepoxides and dianhydrides with fluorocarbon backbones.

In preparing an amorphous proton conducting electrolyte, for example, the polymeric matrix can be a poly(ethylene reactive) compound and the halocarbon compound is a halogenated diolefin. A suitable polymer is branched, and the diolefin can be 3,3,4,4-tetrafluorohexa-5,5-diene. In the organic polymeric matrix, branched or linear polyethyleneimines can have molecular weights in the range from about 400 to 100,000 with a plurality of reaction sites.

The amorphous proton conducting electrolyte can be prepared in the presence of a protonic acid catalyst, which can speed the reaction of a branched polyethyleneimine of molecular weight about 50,000 with a fluorocarbon-backbone diepoxide.

The protonic acid catalyst can selected from the class consisting of phosphoric acid, vinyl sulfonic acid, hydrochloric acid, 2-acrylamido-2-methylpropane sulfonic acid, and sulfuric acid.

The invention also can make use of the reaction of a branched polyethyleneimine of molecular weight about 50,000 with a cyclic or linear phosphonitrillic fluoride or chloride. The polymer can be prepared by reaction with a fluorocarbon-backboned diepoxide in the presence of a metallic salt, which can be selected from Group I of the Periodic Table, including lithium salts; Group II of the Periodic Table, including zinc salts; and Group IV of the Periodic Table, including lead salts.

The organic polymeric matrix can contain at least one polyetheramine of a molecular weight about 2000, in the range from about 100 to 5000.

A transparent membrane obtained by heating a branched polyethyleneimine, of molecular weight about 50,000, with a fluorocarbon diepoxide, is stable in air up to temperatures of 300° C., as well as in acids and alkalies up to temperatures of 100° C.

A membrane according to the invention transports protons and anions when in contact with aqueous solutions containing acids or metallic salts, but does not transport metallic cations. It acts only as a lithium ion solid state conductor when organolithium compounds are included in its preparation, and only as an anionic solid state conductor when alkyl halides are included in its preparation.

A flame retardant elastomer of the invention is prepared by the reaction of a branched polyethyleneimine with phosphonitrillic fluoride.

An electrically conducting membrane is obtained by heating a branched polyethyleneimine of molecular weight about 50,000 with fluorocarbon backboned diepoxides in the presence of zero-valent metallic complexes.

A thin film polymer in accordance with the invention is insoluble in water and the constituents are mixed in various ratios according to the properties that are desired.

In a method of the invention the polymer product can be coated over various inorganic or organic support substrates. Additives can be included to act as binders, stabilizers or to modify specific properties.

For an optoelectric composite, electrically active organic polymers or metal oxides are mixed with the constituents. A membrane of the invention can be used as a antifouling paint, as an epoxy, as a fabric, or as a multipurpose filter.

In a method of the invention for preparing a thin-film polymer, an organic polymeric matrix is reacted with a compound having a halocarbon backbone.

Further aspects of the invention will be apparent to those of ordinary skill in the art from the following detailed description.

DETAILED DESCRIPTION

The following series of processes and products in accordance with the invention are presented by way of illustration only, and are not to be construed as limiting the scope and applicability of the invention.

The fluoro-epoxides used in the practice of the invention can be selected from a wide range of compounds, and have extraordinarily high water repulsion, as well as resistance to biological fouling and weathering. In addition, they form water and solvent resistant adhesives when cured with polyetheramines or polyethyleneimines.

Such compositions are useful in the manufacture of durable goods and devices which can withstand physical abuse. Illustrative epoxies and anhydrides are listed below:

Epoxide I

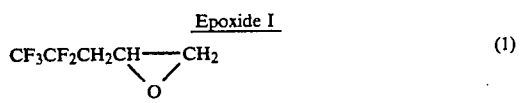
(1)

Epoxide II

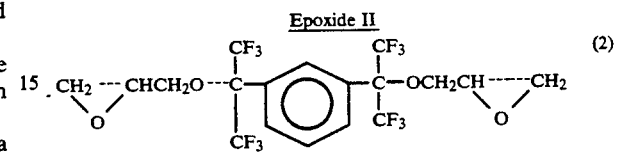
(2)

Epoxide III

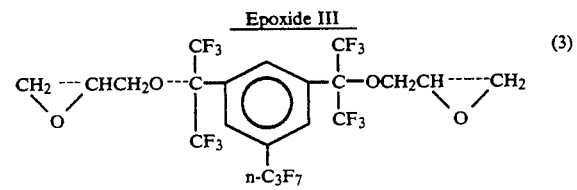
(3)

Anhydride I

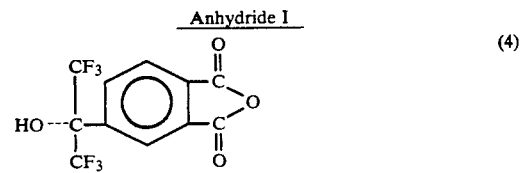
(4)

Anhydride II

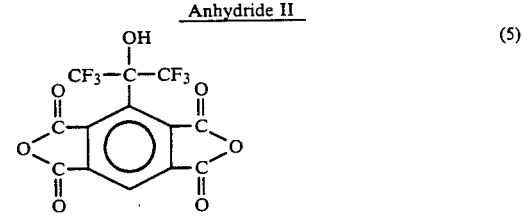
(5)

A. Polyetheramine Composites and Devices

1. Devices with Capacitive Reactance

A solution of polyetheramine in accordance with formula (6), below, is used. The solution is 0.2 molar in acetonitrile containing 8 weight percent lithium trifluoromethanesulfonate.

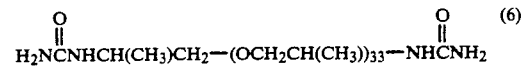
(6)

The polyetheramine solution is mixed with a 0.4 molar acetonitrile solution of Epoxide I (formula 1, page 8).

The mixture is stirred and poured into a 2"×2"×1 cm. glass tray under a fume hood. Solvent slowly evaporates giving a thick and viscous composition, which is cured at 100° C. for 30 minutes to obtain a 1 mm thick film with conductivity of $10^{-6}$ ohm$^{-1}$ cm$^{-1}$.

A 1"×1" portion of this film is laminated to two 0.15 mm thick polyaniline films that are equal in size and grown on stainless steel substrates from acid solution.

Lamination is performed under 5 psi pressure at 150° C. to form a capacitor. The capacitor was charged to 1.0 V, and discharged through 10 ohm resistance for 1000 times without degradation.

A capacitor with same properties is also prepared when Epoxide I is replaced with Anhydride I (formula 4, page 9), except that the composition is cured at 150° C. for one hour. The room temperature conductivity of the cured compositions is $7 \times 10^{-5}$ ohm$^{-1}$ cm$^{-1}$.

2. Transparent Thin Films

Equimolar mixtures of polyetheramine in accordance with formula (7) below:

$$H_2NCH_2CH_2-(OCCH_2CH_2OCH_2CH_2NH_2 \tag{7}$$

and Kiepoxide III (formula 3, page 9) yield transparent thin films when mixed at 0° C. or below and then cured at 60° C. for 30 minutes.

A 0.25 mm thick coating of the above composition was deposited over a copper substrate of size 1 cm×1 cm×1 mm. The coated substrate was weighed and placed in a stirred 0.1 molar sulfuric acid for 48 days at ambient temperature. No formation of copper sulfate formation was observed. The substrate was taken out of the acid bath, water washed and dried by blowing nitrogen gas. The weight gain was 0.09 percent, and the substrate did not allow the passage of electrical current under an applied voltage of 10 V.

The above coating adhered well when applied on a wet substrate of zinc and a rusty substrate of steel. No corrosion was observed using the above technique for a zinc substrate in 0.1 molar sodium hydroxide, and for the steel substrate in 0.1 molar hydrochloric acid. The coatings remained non-brittle.

3. Transparent and Flexible Films

Equimolar quantities of polyetheramine, in accordance with formula (8) below:

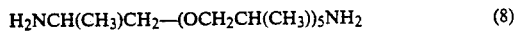

$$H_2NCH(CH_3)CH_2-(OCH_2CH(CH_3))_5NH_2 \tag{8}$$

and Diepoxide II (formula 2, page 9) yield transparent and flexible films from solutions in 2-chloro-1,1,2-trifluoroethyl ethyl ether. Films with a thickness of 0.1 mm or less adhere well to substrates of glass, metals, wood, plastics and fabrics such as polypropylene.

These films were tested as in the previous test and were found to be water repellant and corrosion proof. The film composition can be mixed with various metal oxide powders for decorative paints and colorful inks. The coatings are characterized by drag reduction, and are antifouling in marine environments. They can be used for the water proofing of wooden structures, as well as concrete and asphalt compositions. They also are easy to clean.

Electroconductive coatings and adhesives are prepared by mixing silver flakes (such as those available from Degussa under the trade name "Demetron D35"). In one test, the flakes were 80% by weight in the above composition, which was cured at 80° C. for 30 minutes.

4. Protective Coatings

Equimolar quantities of polyetheramine in accordance with the formula (9) below:

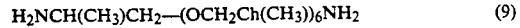

$$H_2NCH(CH_3)CH_2-(OCH_2Ch(CH_3))_6NH_2 \tag{9}$$

and Kiepoxide II (formula 2, page 9) are completely mixed, and coated over a clean copper substrate. The composition is cured at 100° C. for 30 minutes to form a 0.5 mm thick film. The coated copper substrate is then placed in a one litre glass flask, along with an uncoated copper substrate of equal size. The flask is filled with 1% $H_2S$ gas in a nitrogen-balanced gas, which had been bubbled through water, Within five days, the uncoated copper substrate is completely tarnished by the formation of copper sulfide, while the coated copper substrate remains unaffected in this environment.

In the above composition, Diepoxide II (formula 2, page 9) was replaced by Dianhydride II (formula 5, page 10) to produce adherent and had coatings with properties similar to those described above. The compositions using dianhydrides are easy to cure, and form adherent and hard coatings when baked at temperatures higher than 100° C. The compositions involving polyetheramines can be cured at room temperatures or below. The reaction rates for the polyetheramine of formula (7) are very rapid with diepoxides, which can be controlled by using amine-adducts or by mixing with small quantities of one or more other polyetheramines, such as those of formula (8) or (9). Thin film coatings involving polyetheramines find application in the electronics packaging industry, in addition to their uses as marine, anticorrosion, antifouling and decorative paints. The coatings involving dianhydrides are slow to cure, and produce hard films, which can be applied on various substrates for insulation, encapsulation or protection.

B. Composites from Polyacrylamides

Polyacrylamide, $(-CH_2CH(CONH_2))_x$, of molecular weight 12,000 is mixed in methanol and reacted with a 3% by weight methanol solution of epoxide II (formula 2, page 8). The resulting composition was sprayed on aluminum, as well as on plywood substrates, and cured at 60° C. for 40 minutes, The thin film coatings thus produced were about 0.2 mm thick and adhered well with the substrates. The coated substrates did not absorb appreciable amounts of moisture when left in humid environments for 30 days. When left under water for two weeks, the weight gain for each coated substrate was about 0.12%.

Polyacrylamides of molecular weights in the range of 22,000 to 600,000 were combined in solution phase with 1 to 6 weight percent of Epoxide I (formula 1, page 8), Epoxide III (formula 3, page 9) or Dianhydride II (formula 5, page 10). In each case the cured compositions were water resistant, non-brittle and adherent to metals and non-metals such as glass, wood and ceramics. Various coloring agents, brighteners, and suitable organic solvents can be used with these compositions to produce paints of desired nature.

C. Composites from Polyallylamines

Polyallylamine, $(-CH(CH_2NH_2)CH_2CH_2-)_x$, of molecular weight of about 60,000 was mixed with 4 percent by weight of Epoxide II (formula 2, page 8) in methanol. The mixture was sprayed over aluminum, titanium, steel and plywood substrates, and cured at 80° C. for one hour. The resulting 0.25 mm thick coatings were scratch and water resistant. The use of Anhydride II (formula 5, page 10) instead of Epoxide II (formula 2, page 9), provided the coatings with similar properties as above, but the reaction rate was more controllable and the cure temperature was around 200° C., to produce hard and adhesive coatings.

D. Composites and Devices from Polyethyleneimines

1. Flexible Coatings

Branched polyethyleneimine, "BPEI", of formula (10) below:

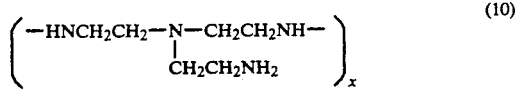

(10)

with a molecular weight of 50,000 and about 50% by weight in water, was mixed slowly with concentrated sulfuric acid to a pH of 2.

Epoxide I (formula 1, page 8), 5% by weight with respect to the imine was mixed in the above gel-like composition, and immediately coated over a porous polypropylene film (such as that sold under the trade name "FS 2106, Viledon Separator"). Upon addition of the Epoxide, water is immediately thrown out the composition, which spontaneously solidifies to give a flexible coating.

The coated film was wrapped between two tubular thin titanium electrodes which kept the film tightly spaced and has a length of 12 inches. A gas mixture having the composition $SO_2$ 10%, $N_2$ 80%, $CH_4$ 50% and $C_2H_6$ 5% was passed between the two electrodes by circulation through a loop, with a pressure of 5 psi for twenty minutes.

Then the composition of the circulating gas was tested. It had only 1.5% $SO_2$, while the concentration of the other gases remained unchanged. The electrode chamber (absorption tower) was purged with $N_2$ gas, while analternate voltage of $\pm 5$ V/2 sec was applied across the electrodes for 5 minutes, which regenerated the absorbed $SO_2$. The absorption and release of $SO_2$ could be carried out for more than one million times over the same solid electrolyte. The same composite, that is, protonated polyethyleneimine, absorbed and released other electron-rich compounds, which are electron-pair donors (Lewis bases) like dimethysulfoxide, nitrogen oxide $NO_x$, CO, $C_6H_5NC$ etc. Such compounds are attracted by the protonated sites on the polymeric chain to form weak complexes. With the application of a suitable alternating voltage or current, the protonated site is delocalized along the polymeric chain to release the attached molecules in pure form.

Branched as well as linear polyethyleneimines of different molecular weights in the range of about 400 to 100,000 can be used to form these composites without the use of fluoro-epoxides or fluoro-anhydrides, as taught in my previous invention of U.S. Pat. No. 5,028,124. Instead, use is made of mono- as well as di-epoxides and anhydrides to produce more easily processable, moldable, porous and anhydrous compositions.

Such composites are also formed when branched polyethyleneimine is replaced by triethylenediamine, hexamethylenetetramine and polyallylamine. Sulfuric acid can be replaced by other protonic acids including hydrochloric acid, phosphoric acid, 2-acrylamido-2-methylpropane sulfonic acid, bisulfates, biphosphates, or their salts containing protonic hydrogen. The pH of these composites can be in the range of 0 to 6, but a suitable range is a pH of 1 to 3.

The above process is useful for removal and recovery of toxic gases, such as $SO_2$, from exhausts of coal and gas burning industrial and utility plants.

It will be appreciated that the absorption chamber for $SO_2$ can assume any desired shape and size. The separated $SO_2$ can be converted to sulfur or sulfuric acid. The release of complexed $SO_2$ by alternating electrical potential is a more economical process, than its release by heat alone.

2. Fabrication of Filters

Branched polyethyleneimines (BPEI) of molecular weight of 1200 to 30,000 are commercially available with 99% purity (the balance being water), and are very soluble in common organic solvents. Due to the known stability of BPEI in highly acidic, as well as in highly alkaline solutions, these polymers are ideal for the fabrication of filters to be used with corrosive liquids or gases, as a replacement for ceramic and metallic filters. When combined with 1 to 20% by weight of fluoro-epoxides or fluoro-anhydrides, these compositions can be coated over several porous substrates of choice such as polypropylene or Teflon, which is polytetrafluoroethy. The compositions with high molecular weight BPEI (30,000 to 60,000) can be molded into the desired filters without the use of a supporting substrate.

The filter pore size can be controlled by the selection of the supporting substrate. Filters for hyperfiltration can use fabrics of "Celgard-2500" (the Hoechst trade name for "Celanese" polypropylene fabric). Particulate filters for liquids and gases can use fabric of the "FS 2106 Viledon Separator" type. A typical preparative method is described below.

A 10% by weight solution of BPEI of molecular weight about 30,000 was cooled to 0° C. and mixed with 22% by weight (relative to BPEI) of Epoxide II (formula 2, page 9) in methanol and stirred. Celgard-2500 fabric, which is 1 mil thick and 45% porous, is dipped in the mixture for five minutes, and initially cured by hanging at ambient temperature for one hour, and then at 60° C. for 30 minutes. The cured filter had a pore size of 0.1 micron. Such filters can be made into cartridges or discs as desired. The pore size also can be controlled by double dipping, and by the centration of the coating solution. Alternatively, the filters can also be prepared by coating the compounds on the fabric, and then by heat pressing without any solvent.

The filters also can be used to remove particles from air, and to collect acid gases from industrial exhaust. BPEI can absorb acids, while base neutralization regenerates the filter for reuse. Filter discs can be made by the use of Dianhydride II (formula 5, page 9) with BPEI of molecular weight about 50,000.

The coated "Celgard" filter described above did not degrade when acidic hydrochloric solution of pH=1 and sodium hydroxide solutions of pH=12 were filtered through it. The cartridges made from this filter absorbed acid fumes of HCl from the gaseous exhaust produced by burning waste organotin compounds.

3. Anticorrosion, Antifouling, Drag Reduction and Water Proofing Paints and Compositions The compositions can be prepared by mixing BPEIs with 2-25 weight percent of fluoro-epoxides. The imine N (nitrogen) atoms have excellent properties for coordinating with metals and other substrates. The N-H group can form hydrogen bonds with several substrates, such as glass or polymers, while fluorocarbon groups repel water.

The BPEI of molecular weight of 1800 was mixed with 25 weight percent of Epoxide III (formula 3, page 8) in toluene. The mixture was coated on copper and plywood substrates and cured at 60° C. The coated copper substrate did not degrade in ocean water, or in an atmosphere of $H_2S$ gas. When a coated plywood substrate was kept immersed in water for 30 days, its increase in weight was only 0.1%. The coated substrates can be easily cleaned, while the coating compositions of 1 mm thickness are self-adhering to metals, plastics, wood and concrete.

It will be appreciated that the coating compositions can be prepared as desired. Several additives such as metal oxides, solvents, driers etc. can be added to the BPEI of the desired molecular weight with the selected fluorocarbon molecule. A metal salt can be added to prepare antistatic coatings, and colorants can be added to prepare decorative coatings. For chemical applications, the coatings can be applied over glass beads or silica gel spheres. Depending upon the basic properties of the polyethyleneimines, and by using minimum amounts of fluoro-epoxides or anhydrides, such spheres can be used to trap acids form water, and both organic and inorganic industrial wastes. The spheres are also useful in chromatography, and protein or metal-ion binding.

4. Free-Standing Films

The BPEI of molecular weight of 50,000 was mixed with $KHSO_4$ in acetonitrile to a pH of 5. A mixture of Epoxide II (formula 2, page 8) in acetonitrile (2% by weight relative to BPEI) was added to the above mixture and the composition was cast to produce a free standing 1 mm thick film with room temperature conductivity of $3 \times 10^{-3}$ ohm$^{-1}$ cm$^{-1}$. The $KHSO_4$ was replaced by $RuO_2$ powder to prepare 0.8 mm thick oxide electrodes. The $KHSO_4$ containing electrolyte was sandwiched between $RuO_2$ containing electrodes, which in turn were sandwiched between two titanium electrodes to fabricate a capacitor.

The capacitor was charged to 1.0 V and discharged through 10 ohms of resistance for 1000 times in the temperature range of $-50°$ to $150°$ C. without degradation.

It will be appreciated that other alkali metal salts or protonic acids can be substituted for $KHSO_4$, while other oxides, carbon or electronic polymers like polyaniline can be substituted for $RuO_2$.

E. Anion and Proton Transport Membranes

A 20% methanol solution of BPEI of molecular weight 50,000 was mixed slowly with dilute hydrochloric acid to a pH of 7. Diepoxide II (formula 2, page 9) (2% relative to BPEI) in methanol was added slowly to the above mixture at 5° C. The mixture was stirred well. A "Celgard coating 2500" fabric was dipped into the mixture for 10 minutes, cured by hanging at room temperature for one hour and then cured at 80° C. for 40 minutes to prepare the membrane.

A portion of the above membrane was used as a separator between hydrochloric acid solutions of pH of 1 and 6 in two compartments. After four hours, the pH of both compartments was the same, indicating proton and anion transport through the membrane.

With the same membrane, containing 0.1 molar zinc chloride in one compartment, and 0.5 molar zinc chloride in the other compartment, a potential across the membrane stayed the same, until the solutions were reduced in volume to out-crystallize the salts. The test indicates the $Zn^{+2}$ cations cannot pass through the membrane.

Another portion of the above membrane was used as a separator between cathode and anode compartments of a cell containing acidic ferrous sulfate electrolyte. It restricted the passage of $Fe^{+2}$ and $Fe^{+3}$ ions across the cell compartments, but allowed the passage of anions and protons, which was essential for the charge/discharge cycles of the iron-iron battery.

When the membrane was used as a separator between zinc and silver oxide electrodes in potassium hydroxide, it did not degrade. The battery performed well with the mixing of zinc and silver ions being restricted.

Membranes with similar properties were prepared when Diepoxide II (formula 2, page 9) was replaced by Epoxide I (formula 1, page 8), Diepoxide III (formula 3, page 9) or Dianhydride II (formula 5, page 10). It will be appreciated that the addition of an acid to BPEI before the addition of fluoro-epoxides or fluoro-anhydrides is not necessary. Membranes of equally good quality and the same properties can be prepared without the use of acids or salts.

F. Proton Transport Electrolytes

The BPEI of molecular weight of 30,000 was brought to a pH of 7 with dilute sulfuric acid. Anhydride II, (formula 2, page 8) (2% by weight relative to BPEI) was mixed with the viscous liquid. The mixture was spread in a glass tray and cured under nitrogen gas at 180° C. to give a 0.30 mm thick free standing film with a conductivity of $5 \times 10^{-5}$ ohm$^{-1}$ cm$^{-1}$. The protonic conductivity of the film was confirmed further by the operation of the following devices.

The film was pressed between two conductive tin oxide coated glass plates one of which has a thin film of tungsten oxide on it. With the application of a voltage of $\pm 2$ V/2 sec, a cathodic coloration of tungsten oxide electrochromic device was observed according to the reaction (11):

$$WO_3 + xH^+ + xe^- \rightleftarrows H_xWO_3 \text{ (blue)} \quad (11)$$

When two platinum metal electrodes were placed in a cell across a portion of the above film, an electrocatalytic fuel cell reaction of oxygen and hydrogen took place to produce water in the cell and electric current in the external circuit.

Furthermore, a catalytic reaction of carbon dioxide and hydrogen across this film produces methanol when current is passed between two platinum electrodes.

The film produced as described above was dipped in concentrated sulfuric acid, and then placed between lead and lead oxide plates. A lead acid cell with $Voc = 1.5$ V and a short-circuit current $(Isc) = 70$ mA was produced.

Furthermore, the above film was used as an electrolyte in a cell for water electrolysis, and also as an electrolyte for nickel hydride battery.

It will be appreciated that BPEIs of molecular weights of 400 to 100,000 can be used in the preparation of the above films with fluoro-epoxides or fluoro-anhydrides, while protonic acids or salts can be selected as desired from phosphoric acid, hydrochloric acid, bisulfates and biphosphates, etc.

G. Use of Acid Catalysts

When protonic acids are added to aqueous or non-aqueous solutions, for example of poly(ethyleneimine), they produce active electronic centers on nitrogen atoms to catalyze addition reactions with unsaturated molecules having pHs in the range from about 1–6. Such reactions can take place without catalysis, but the reactions are promoted by catalysis, as illustrated below:

1. Divinyl Cross-Linking With Sulfonic Acid Catalysis

Vinyl sulfonic acid solution in methanol is added slowly to a methanol solution of a BPEI of structural formula (10), above, with a molecular weight about 50,000 to a pH of 2.

Then, a divinyl fluorocarbon, such as a solution in methanol of 3,3,4,4,-tetrafluorohexa-1,5-diene $CH_2=CHCF_2CF_2CH=CH_2$, illustratively a 2 weight percent relative to the amount of BPEI, is added and the mixture stirred.

The mixture starts becoming viscous after thirty minutes. Flexible, transparent, and thin films can be cast or coated from this mixture over a variety of substrates.

A film of 0.5 mm thickness, dried at 120° C. had a room temperature conductivity of $5 \times 10^{-5}$ ohm$^{-1}$ cm$^{-1}$. The protonic conductivity of the film was confirmed by using it as an electrolyte in a cathodically colorable tungsten oxide electrochromic device according to reaction (12), below:

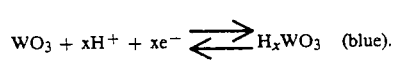  (12)

Furthermore, a catalytic reaction of carbon dioxide and hydrogen across this film produces methanol when current is passed between two platinum electrodes.

In a further illustration of the above process, vinyl sulfonic acid is replaced by 2-acrylamido-2-methylpropanesulfonic acid [CH2=CHC(O)N(H)C(CH3)2CH2SO3H] and the resulting films dried at 200° C.

When two platinum metal electrodes were placed in a cell across such a film, an electrocatalytic reaction of oxygen and hydrogen took place to produce water in the cell and electric current in an external circuit.

Before solidification, the electrolyte compositions can be coated over porous substrates such as polypropylene to provide bipolar membranes which allow the passage of cations or anions as desired in cells with liquid electrolytes.

H. Further Composites Prepared by Diepoxide Cross-Linking

Diepoxides for use as cross-linkers can be prepared by reacting epichlorohydrin with halocarbon compounds such as the following:

(a) 1,3-bis(1,1,1,3,3,3-hexafluoro-2-hydroxypropyl) benzene, shown structurally in formula (13), below:

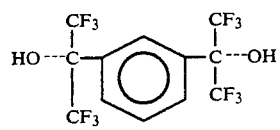  (13)

(b) 4,4'-bis(1,1,1,3,3,3-hexafluoro-2-hydroxypropyl)-diphenyl ether, of formula (14), below:

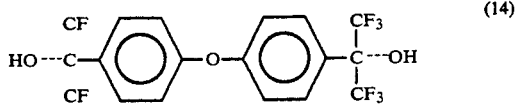  (14)

(c) 2,2-bis(4-hydroxyphenyl)hexafluoropropane, of formula (15), below:

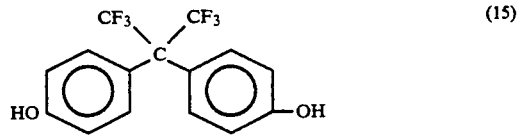  (15)

To illustrate diepoxide cross-linking in accordance with the invention, the fluorocarbon benzene of formula (13) above is combined with epichlorhydrin according to reaction (16), below:

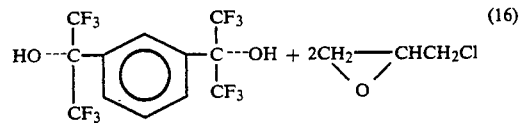  (16)

The reaction (16) produces the Diepoxide II of formula (2), page 9, above. In order to produce a diepoxide composite, a methanol solution of BPEI is mixed with a diepoxide solution in trifluorotrichloroethane, having a weight ratio of 2:1 and total concentration of 10% by weight.

The mixture was placed in a plastic tray to a depth of one centimeter. After the evaporation of solvent at 30° C., the tray was heated at 60° C. for one hour. A flexible and transparent thin film of 0.4 mm thickness was peeled from the tray.

When the film was used as a separator between cathode and anode compartments of a cell containing acidic ferrous chloride electrolyte, it limited the passage of water across the cell compartments, but allowed only the passage of protons and anions.

When methyl bromide (10% by weight relative to the amount of BPEI) was used in the preparation of the thin film, the resulting dried film possessed anionic conductivity due to the presence of bromide ions in the quaternized composite.

When the diepoxide composite film, prepared as described above from BPEI and diepoxide, was immersed in concentrated hydrochloric acid for twenty minutes and then dried in air at 130° C., the resulting film had a conductivity of $10^{-4}$ ohm$^{-1}$ cm$^{-1}$. This film was used as a proton conducting electrolyte in a nickel hydride battery without any moisture under hydrogen gas pressure to produce the reaction (17), below:

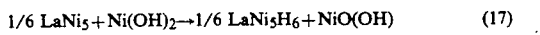  (17)

where La is Lanthanum (Group III B);
Ni is nickel;
O is oxygen and H is hydrogen.

The battery had an open-circuit voltage (Voc) of 0.9 Volts (V) and was charged and discharged between 1.5 V and 0.8 V five thousand times without any degradation.

During the diepoxide composite film production process described above, phosphotungstic acid solution in methanol (0.8 weight percent relative to BPEI) was added to the reaction mixture. The resulting film was transparent. This film underwent several thousand reduction-oxidation cycles with cathodic coloring in accordance with equation (18), below:

$$WO_3 + xA^+ + xe^- \rightarrow A_xWO_3 \quad (18)$$

where W is tungsten;

A is a cation such as $Li^+$, or $H^+$, supplied by a separate solid state electrolyte in an electrochromic device.

Similarly, an anodically coloring composite film was obtained when phosphotungstic acid was replaced by polyaniline solution in acetic acid in the preparation of the above film.

The film produced as described above was placed in concentrated sulfuric acid and then dried and placed between lead and lead oxide plates. A cell with a $V_{oc} = 1.5$ V and a short-circuit current $(I_{sc}) = 70$ mA was produced.

I. Other Composites Prepared from Polyetheramines

Equimolar quantities of polyetheramine, in accordance with formula (19), below:

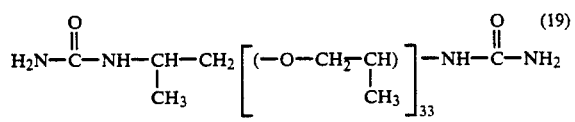

an diepoxide yield transparent films from hot (60° C.) solutions in 2-chloro-1,1,2-trifluoroethyl ethyl ether cast in plastic or glass trays.

When such polyetheramine films are cast in the presence of lithium trifluoromethanesulfonate (10% by weight relative to the organic film), $Li^+$ conducting films with a conductivity of $10^{-6}$ ohm$^{-1}$ cm$^{-1}$ are obtained.

These films were used as an electrolyte for a solid state polyaniline-lithium battery, and also for polyanilinetungsten oxide electrochromic device.

J. Composites Prepared from Phosphonitrillic Halides

When mixtures of branched poly(ethyleneimine) of molecular weight of 50,000 are heated with phosphonitrillic fluoride (—N=PF$_2$—)$_3$, (2% by weight) at a temperature of 200°–250° C., a flame resistant moldable material is obtained. It can be cast into various shapes as rubber for several applications such as heat resistant elastomers.

The foregoing examples are for illustration only, and other adaptations of the invention will be readily apparent to those of ordinary skill in the art.

What is claimed:

1. A polymeric film prepared by combining:
   a. an organic polyreactive matrix with oxygen, sulphur or nitrogen reaction sites; and
   b. a compound having a halocarbon backbone.

2. The film of claim 1 wherein said organic polyreactive matrix is selected from the class consisting of polyethyleneamines; polyethyleneoxides; polyethylenesulfides; polyacrylamids; polyacrylimids; polyethyleneimines and polyetheramines.

3. A polymeric film of claim 1 wherein said reaction is speeded by a protonic acid catalyst selected from the class consisting of phosphoric acid, vinyl sulfonic acid, hydrochloric acid, 2-acrylamido-2-methylpropane sulfonic acid, and sulfuric acid.

4. A polymeric film of claim 1 which is prepared by the reaction of a branched or unbranched poly with an anhydride having a fluoro-carbon backbone, and is drag reducing, anticorrosive, antifouling and water and solvent repellent.

5. The polymeric film of claim 1, wherein the organic polymeric matrix includes branched or linear polymers of molecular weights in the range from about 400 to 100,000 with a plurality of reaction sites.

6. The method of using the polymeric film of claim 1 as a multipurpose filter; and acid absorbing and acid releasing material; or an absorber or releaser of electron-rich compounds under reversible voltages or currents.

7. A polymeric film of claim 1 which is prepared by a reacting a polymer of molecular weight in the range about 100 to 20,000, with a fluorocarbon backboned epoxide, vinyl or anhydride in a metallic salt.

8. The polymeric film of claim 7 wherein said metallic salt is selected from the class of alkali metal salts, lithium salts, and lead salts.

9. A polymeric film in accordance with claim 1 forming a transparent membrane which is obtained by heating a branched or unbranched polymer with a compound having a fluorocarbon backbone; and is stable in air up to temperatures of 300° C. and in acids and alkalies up to temperatures of 100° C.

10. A film polymer of claim 1 which transports protons and anions when in contact with aqueous solutions containing acids or metallic salts, but does not transport metallic cations.

* * * * *